United States Patent [19]

Patzelt

[11] Patent Number: 4,531,760
[45] Date of Patent: Jul. 30, 1985

[54] POWER STEERING FOR MOTOR VEHICLES

[75] Inventor: Helmut Patzelt, Kernen, Fed. Rep. of Germany

[73] Assignee: Daimler-Benz Aktiengesellschaft, Stuttgart, Fed. Rep. of Germany

[21] Appl. No.: 558,272

[22] Filed: Dec. 5, 1983

[30] Foreign Application Priority Data

Dec. 10, 1982 [DE] Fed. Rep. of Germany ....... 3245741

[51] Int. Cl.³ .............................................. B62D 1/18
[52] U.S. Cl. ..................................... 280/777; 74/492; 180/78
[58] Field of Search .......................... 280/777; 180/78; 74/492

[56] References Cited

U.S. PATENT DOCUMENTS

| | | | |
|---|---|---|---|
| 3,505,897 | 4/1970 | Scheffler | 280/777 |
| 3,521,724 | 7/1970 | Mayer | 280/777 |
| 3,923,319 | 12/1975 | Nonaka et al. | 280/777 |
| 4,228,695 | 10/1980 | Trevisson et al. | 280/777 |
| 4,365,825 | 12/1982 | Merkle | 280/777 |

Primary Examiner—Joseph F. Peters, Jr.
Assistant Examiner—Kenneth R. Rice
Attorney, Agent, or Firm—Barnes & Thornburg

[57] ABSTRACT

A steering system is provided for motor vehicles with a multiple-part steering column, in which a rigid steering column part in the vicinity of the steering wheel is guided in an outer tube and in which a plastically deformable second steering column part, for example in the form of a corrugated tube, is located between this first steering column part and the steering gear, and in which the outer tube is fastened to a cross support passing between the windshield pillars of the vehicle. In order to obtain a flatter attitude of the outer tube and thereby a lowering of the steering wheel in the case of a frontal collision, provision is made according to the invention for the outer tube to be additionally supported by means of at least one strut, or similar device, passing in the interior of the vehicle in front of the front bulkhead, on a cross support passing below the windshield.

7 Claims, 4 Drawing Figures

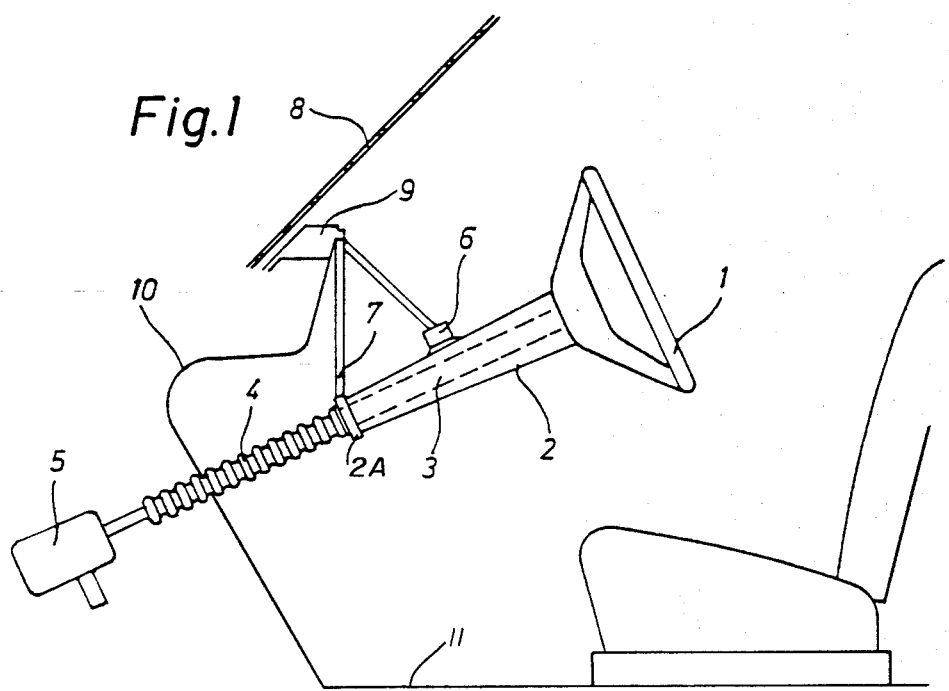
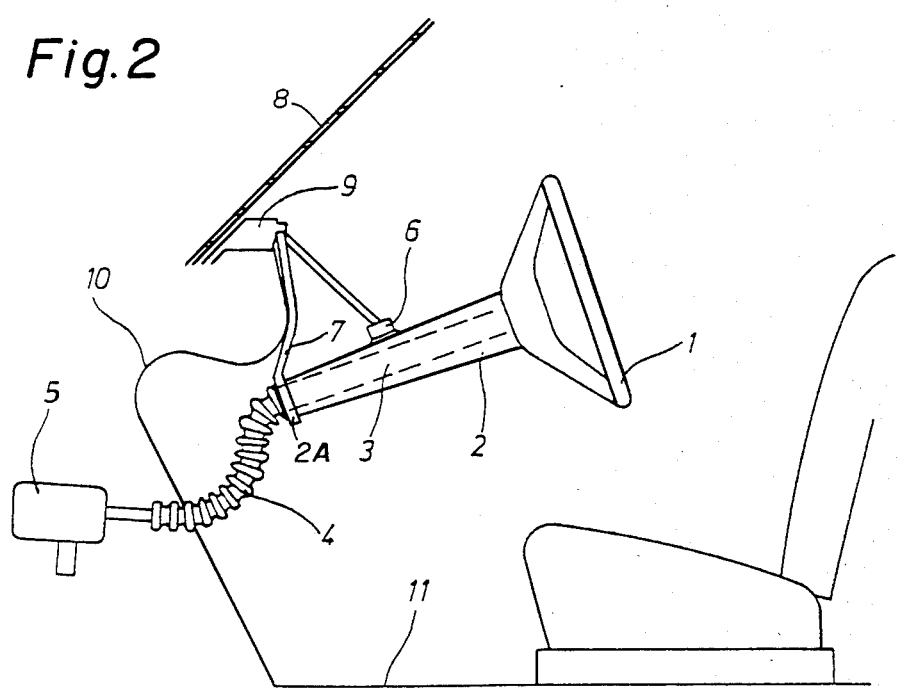

POWER STEERING FOR MOTOR VEHICLES

BACKGROUND AND SUMMARY OF THE INVENTION

The invention relates to a steering system for motor vehicles with a multiple-part steering column, in which a rigid steering column part in the vicinity of the steering wheel is guided in an outer tube and in which a deformable second steering column part, for example in the form of a corrugated tube, is located between this first steering column part and the steering gear, and in which the outer tube is fastened to a cross support passing between the windshield pillars of the vehicle.

A basic object of the present invention is to so arrange a steering system of the above-noted type that, with substantial vehicle front structure deformation in the case of a frontal collision, the outer tube is placed in a flatter attitude and the steering wheel is thereby lowered in order to obtain more favorable conditions regarding the impact of the driver onto the steering wheel.

This object is achieved according to the invention by providing that the outer tube is additionally supported on a cross support passing below the vehicle windshield by means of at least one strut or similar device passing in the interior of the vehicle in front of the front bulkhead.

The two cross supports remain substantially stationary even in the case of significant front structure deformation when the vehicle experiences a frontal collision. In contrast, the front bulkhead experiences rearward displacement due to the vehicle engine or its accessory parts impinging on it. As a consequence of this rearward displacement of the front bulkhead, it in turn impinges on and effectively shortens the steering column support strut or struts proposed by the invention. The shortening of the strut or struts results in a pivoting of the outer rigid support tube of the steering system about the cross support passing between the windshield pillars (A-columns) and thereby a lowering of the steering wheel.

For this purpose, particularly favorable conditions are given if the strut, in an especially advantageous embodiment of the invention, is applied to the end of the outer support tube which is remote from the steering wheel.

Particularly good stabilization of the steering system in the vehicle cross direction is achieved according to especially refined embodiments by providing two struts which cross in X-shape and are fastened to the cross support on a wide base.

Stabilization according to certain preferred embodiments is achieved with the strut formed as a sheet metal plate which has a wide base acting as the fastening to the cross support.

Finally, certain preferred embodiments include the metal plate strut with cutouts for weight reduction.

Further objects, features, and advantages of the present invention will become more apparent from the following description when taken in connection with the accompanying drawings which shows, for purposes of illustration only, several embodiments in accordance with the present invention.

BRIEF DESCRIPTION OF THE DRAWINGS

FIG. 1 is a side schematic view of the front bulkhead area of a motor vehicle, not shown in greater detail, with a safety steering system in its in use design position, constructed in accordance with a preferred embodiment of the invention;

FIG. 2 is a view similar to FIG. 1, but schematically showing the FIG. 1 system after a front structure deformation caused by a collision;

DETAILED DESCRIPTION OF THE DRAWINGS

Figure 3:
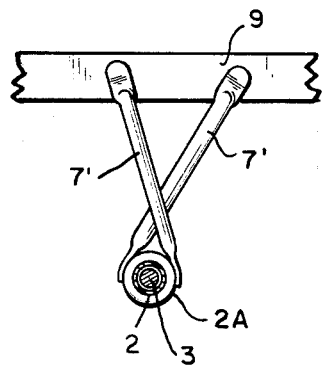
FIG. 3 is a schematic partial view from inside the vehicle toward the front showing a steering system support strut connection, constructed in accordance with a further embodiment of the invention.

The safety steering system shown in FIGS. 1 and 2 has a steering wheel 1, to which is connected a relatively short outer support tube 2, in which is guided a first, rigid steering column part 3. Part 3 is connected to a steering gear 5 via a second deformable steering column part 4, formed as a corrugated tube. In this arrangement, the outer tube 2 is fastened to cross support 6 extending between the windshield pillars at lateral sides of the windshield (not shown). Outer tube 2 is further supported at its lower end connection 2A with the intermediate connection of a support strut 7 to a cross support 9 passing below the windshield 8. Support strut 7 is formed as a tube with flattened end sections which end sections are fixedly connected to the tube 2 and cross support 9.

The front boundary of the interior of the vehicle equipped with this steering system is formed by a front bulkhead 10, which extends from the cross support 9 below the windscreen 8 down to the floor 11.

In the case of a frontal collision, the cross supports 6 and 9 remain practically free of rearward displacement, whereas, due to the internal combustion engine or its accessory parts (not shown in the drawing) located in the front structure, the front bulkhead 10 is deformed in the manner shown in FIG. 2 in the region below the stiff, locationally fixed cross support 9. In this process, the front bulkhead 10 impinges on the support strut 7 and deforms the latter in such a way that its affective length is reduced. This, however, means that the outer tube 2 is raised at its end 2A remote from the steering wheel and pivoted as a whole about its fastening to the cross support 6 so that the steering wheel 1 is lowered into a favorable position for a driver impact.

FIG. 3 schematically depicts a modified support strut assembly 7'7' interposed between lower end 2A of the rigid support tube and the cross support 9. Strut assembly 7'7' is formed from two struts which cross in X-shape and are attached at a wide spacing at cross support 9 to lend stability. The strut assembly 7'7' operates in the same manner as described above for the FIG. 1 embodiment to effectively shorten during frontal collisions by abutment with the bulkhead and cause a pivoting lowering movement of steering wheel 1 about cross support 6.

Figure 4:
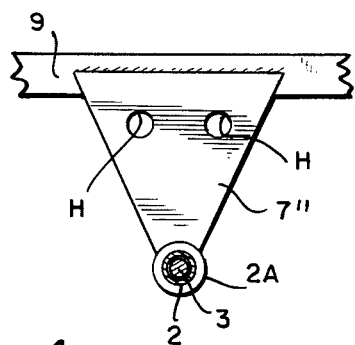
FIG. 4 is a schematic partial view from inside the vehicle toward the front showing a steering system support strut connection, constructed in accordance with a still further embodiment of the invention.

FIG. 4 schematically depicts a still further embodiment of a strut assembly 7" interposed between the lower end 2A of the rigid support tube and the cross support 9. Strut assembly 7" is formed from a flat sheet metal plate which has a wide base secured to the cross support 9 for stability. Holes have been provided as a weight and material saving measure. Strut assembly 7"

also operates in the same manner as described above for the FIG. 1 embodiment to effectively shorten during frontal collision by abutment with the bulkhead and cause pivoting lowering movements of steering wheel 1 about cross support 6.

While I have shown and described several embodiments in accordance with the present invitation, it is understood that the same is not limited thereto but is susceptible to numerous changes and modifications as would be known to those skilled in the art of the present disclosure and I therefore do not wish to be limited to the details shown and described therein but intend to cover all such changes and modifications as are encompassed by the scope of the appended claims.

What is claimed is:

1. Steering system for motor vehicles with a multiple-part steering column, in which a rigid steering column part in the vicinity of the steering wheel is guided in a rigid outer support tube and in which a deformable second steering column part is located between this first steering column part and the steering gear, the outer tube being fastened to a crash-resistant vehicle part by support strut means connected to the outer tube at a position spaced from the steering wheel, wherein the crash-resistant vehicle part is formed by a cross support passing directly below the vehicle windshield, and wherein the support strut means passes so closely in front of a front bulkhead bounding the vehicle interior space that the bulkhead impinges on the strut support means and reduces the length thereof in the event of rearward displacement of the bulkhead during a frontal collision or the like, whereby the steering wheel is effectively lowered.

2. Steering system according to claim 1, wherein the outer tube is fastened to a lateral cross support means passing between windshield pillars of the vehicle, the connection of the strut means to the outer tube being at the side of the lateral cross support means remote from the steering wheel so that shortening of the strut means during a frontal collision or the like results in a pivoting of the outer tube about an axis through the connection of the outer tube at the lateral cross support means.

3. Steering system according to claim 2, wherein the strut means is connected to the end of the outer tube which is opposite the steering wheel.

4. Steering system according to claim 2, wherein the strut means is formed as a tube with flattened end regions.

5. Steering system according to claim 2, wherein the strut means includes two struts which cross in X-shape and are fastened to the cross support on a wide base.

6. Steering system according to claim 2, wherein the strut means is formed as a sheet metal plate which has a wide base acting as a fastening to the cross support.

7. Steering system according to claim 6, wherein the sheet metal plate has holes cut out to save material and reduce weight.

* * * * *